United States Patent
Honma

(10) Patent No.: US 7,066,015 B2
(45) Date of Patent: Jun. 27, 2006

(54) SCANNING PROBE MICROSCOPE

(75) Inventor: Akihiko Honma, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

(21) Appl. No.: 11/136,970

(22) Filed: May 25, 2005

(65) Prior Publication Data

US 2005/0217354 A1    Oct. 6, 2005

Related U.S. Application Data

(62) Division of application No. 10/438,038, filed on May 14, 2003, now Pat. No. 6,904,791.

(30) Foreign Application Priority Data

May 16, 2002  (JP)  ............... 2002-141899

(51) Int. Cl.
*G01N 13/16* (2006.01)
(52) U.S. Cl. ...................................................... 73/105
(58) Field of Classification Search ................ 73/105; 250/306
See application file for complete search history.

(56) References Cited

U.S. PATENT DOCUMENTS 6,005,246 A * 12/1999 Kitamura et al. ........... 250/306
6,661,004 B1 * 12/2003 Aumond et al. ............ 250/306

\* cited by examiner

*Primary Examiner*—Daniel S. Larkin
(74) *Attorney, Agent, or Firm*—Adams & Wilks

(57) ABSTRACT

There is provided a scanning probe microscope capable of simply and accurately confirming whether or not a sample shape satisfies specified conditions. A pseudo reference image Sref1 comprises a pair of reference line profiles Lref1 and Lref2 arranged apart form each other in parallel. An operator moves and rotates the position of the pseudo reference image Sref1 on a screen so that a sample shape line profile fits between the reference line profiles Lref1 and Lref2 of the pseudo reference image Sref1. If it is possible to fit the line profile of the sample shape between the reference line profiles Lref1 and Lref2, it is determined that the sample shape is in spec, while if it is not possible to fit the line profile of the sample shape between the reference line profiles Lref1 and Lref2, no matter how the pseudo reference image Sref1 is moved and rotated, it is determined that the sample shape is out of spec.

3 Claims, 7 Drawing Sheets

SCANNING PROBE MICROSCOPE

CROSS-REFERENCE TO RELATED APPLICATION

The present application is a division of prior U.S. Application Ser. No. 10/438,038, filed May 14, 2003, now U.S. Pat. No. 6,904,791 which is hereby incorporated by reference, and priority thereto for common subject matter is hereby claimed.

BACKGROUND OF THE INVENTION

1. Field of the Invention

The present invention relates to a scanning probe microscope exemplified by an atomic force microscope (AFM), and more particularly relates to a scanning probe microscope for superimposing a pseudo reference tracing a sample shape reference on an observation image and displaying the result.

2. Description of Related Art

With a scanning probe microscope such as an AFM, in order to detect microscopic texture and structure of a sample surface using mutual interaction between the sample surface and a probe, a cantilever having a probe tip mounted on the distal end of the cantilever is used as a probe. If this type of cantilever is used, an attractive force or a, repulsive force is generated based on atomic force between the sample surface and the probe tip when the probe tip is scanned relative to the sample surface. Accordingly, this atomic force is detected as a strain of the cantilever, and if a sample stage is caused to move slowly in the Z axis direction so that this strain is kept constant, that is, so that a gap between the sample surface and the probe tip is kept constant, a slow motion signal at that time or a detected amount of strain represents the shape of the sample surface.

A scanning probe microscope having the above described structure is sometimes used as an inspection device for evaluating whether or not the shape of a sample satisfies specified standards or specifications. As shown in FIG. 18, in the case of confirming whether or not the shape of pits formed on the surface of a CD or DVD satisfies specifications, an application for evaluation is started and four reference cursors L1–L4 are displayed, as shown in FIG. 19. Next, if each of the reference cursors L1–L4 is moved so that an inclined section of a pit is enclosed, an angle $\theta$ of the inclined surface is automatically calculated. An operator then refers to a specification document or step-by-step procedure to confirm upper and lower limits $\theta$min, $\theta$max of the inclination angle, and if the angle $\theta$ has the relationship $\theta$min<$\theta$<$\theta$max with respect to the upper and lower limits $\theta$min, $\theta$max, it is recognized that the pit has a regular shape.

However, with the above described related art technique, not only is it necessary to position the four reference cursors L1–L4 accurately on respectively separate lines, it is also necessary to confirm whether or not the angle obtained falls within a reference range, which means that the time required for evaluation is prolonged. There is also a possibility of erroneously determining that a sample that is out of spec is within spec (or vice versa) due to an incorrect reading of the specification document.

SUMMARY OF THE INVENTION

The present invention is a scanning probe microscope that can easily and accurately confirm whether or not a sample shape satisfies specified conditions.

The present invention is directed to a scanning probe microscope for causing a probe provided on a free end of a cantilever to approach or contact a sample surface, scanning in X and Y directions while moving slowly in a Z direction so that a distance between the probe and the sample surface is kept constant, and displaying a sample image based on a strain amount of the cantilever, comprising the following means.

(1) Means for storing a pseudo reference image representing a sample shape defect decision reference, means for superimposing the pseudo reference image on the sample image, and means for screen display of the superimposed image.

(2) Means for generating a reference signal having a specified peak-to-peak value, means for superimposing a signal representing the amount of strain of the cantilever and the reference signal, and means for displaying a line profile of the superimposed signals, the frequency of the reference signal being lower than the frequency of the signal representing the amount of strain.

With the structure described in (1) above, a pseudo reference image Sref constituting an indicator when determining whether or not the sample shape is good is superimposed on the sample image and displayed, and if it can be confirmed that a line profile of the sample shape has a specified relationship with respect to the pseudo reference image Sref it is determined that the sample is within spec, and so it is easy to determine whether a sample is good or bad.

With the structure described in (2) above, it becomes possible to easily determine whether or not deviation in a signal representing strain amount is a peak value of a reference signal or greater by comparing a minimum level of a superimposed value during a period when the reference signal is H level with a maximum level of the superimposed signal during a period when the reference signal is L level. Accordingly, if the peak value of the reference signal is set to a reference value for good or bad-determination, it becomes possible to determine whether a sample is good or bad simply by confirming an image.

DETAILED DESCRIPTION OF THE INVENTION

Figure 1:
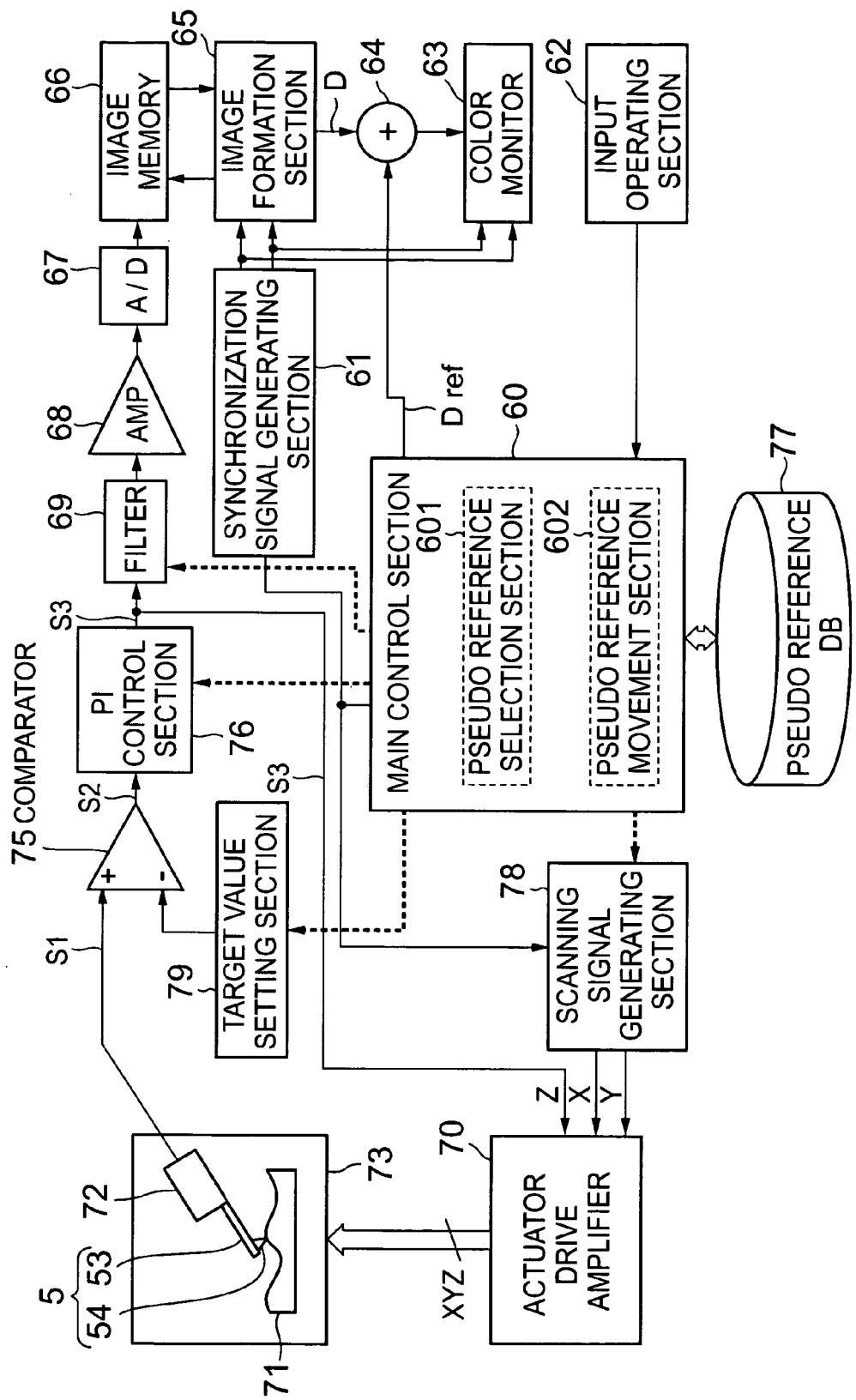
FIG. 1 is a block diagram of a first embodiment of a scanning probe microscope adopting the present invention.

Preferred embodiments of the present invention will be described in detail in the following with reference to the drawings. FIG. 1 is a block diagram showing the structure of a first embodiment of a scanning probe microscope that adopts the present invention. In the drawing, a scanning probe 5 has a probe needle 54 attached to a free end of a cantilever 53 positioned so as to be opposite an observation surface of a sample 71. Strain of the cantilever 53 is detected by a detection section 72 and input to the non-inverting input terminal (+) of a comparator 75 as a strain signal S1 representing a gap between the sample surface and the probe needle 54. A target value signal relating to strain amount of the probe needle 53 is input to the inverting input terminal (−) of the comparator 75 from a target value setting section 79.

An error signal S2 output from the comparator 75 is input to a proportional integral (PI) control section 76, and a signal that is a combination of the error signal S2 and an integral value is input to an actuator drive amplifier 70 and a filter 69 as an actuator drive signal S3 serving as an observation image signal. A scanning signal generating section 78 supplies a scanning signal to the actuator drive amplifier 70. The scanning probe 5, comparator 75, PI control section 76 and actuator drive amplifier 70 constitute a feedback circuit. An actuator 73 drives at least one of the scanning probe 5 and the sample 71 based on a drive signal output from the actuator drive amplifier 70 to control a relative positional relationship between them both.

An output signal from the filter 69 is supplied via an amplifier 68 to an A/D converter 67 as an observation image signal, where it is converted to a digital signal (image data) and stored in an image memory 66. An image formation section 65 outputs an address signal and a read signal to the image memory 66 in synchronism with a clock signal output from a synchronization signal generator 61. In the image formation section 65, image data output from the image memory 66 in response to the address signal and read signal is converted to an analog signal in response to horizontal and vertical synchronization signals supplied from the synchronization signal generator 61 and output to an addition circuit 64. The addition circuit 64 superimposes pseudo reference image data Dref, which will be described later, on the image data D and outputs the result to a color monitor 63.

A main control section 60 controls the target value setting section 79, PI control section 76, filter 69, addition circuit 64 and scanning signal generating section 78 on the basis of control parameters optimum for the scanning probe 5. A pseudo reference selection section 601 of the main control section 60 selects and outputs one from among a plurality of pseudo reference image data stored in a pseudo reference database (DB) 77 based on a select command input from an input operation section 62. A pseudo reference moving section 602 causes movement of a display location, on the color monitor 63, of a pseudo reference image being displayed on the monitor in response to an operation signal input from the input operation section 62.

Figure 2:
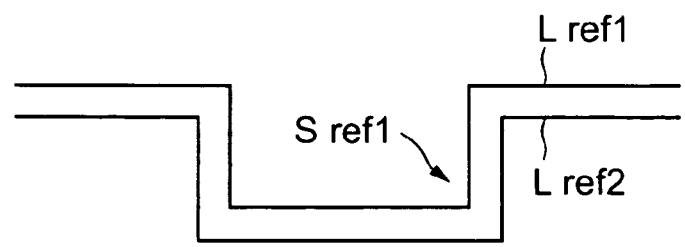
FIG. 2 is a drawing showing one example of a pseudo reference (Sref1).

FIG. 2 is a drawing showing one example of a pseudo reference image Sref (Srf1), and is composed of a pair of reference line profiles Lref1 and Lref2 arranged apart from each other in parallel. This pseudo reference image Sref1 represents a sample shape defect decision reference and constitutes an index when for determining whether the cross sectional shape of a pit formed on a sample surface is good or bad.

Figure 3:
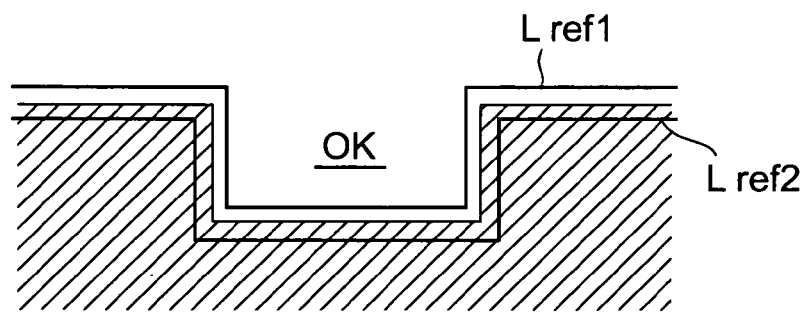
FIG. 3 is a drawing showing a method of determining whether a sample shape is good or bad using the pseudo reference image Sref1 (when result is OK).
Figure 4:
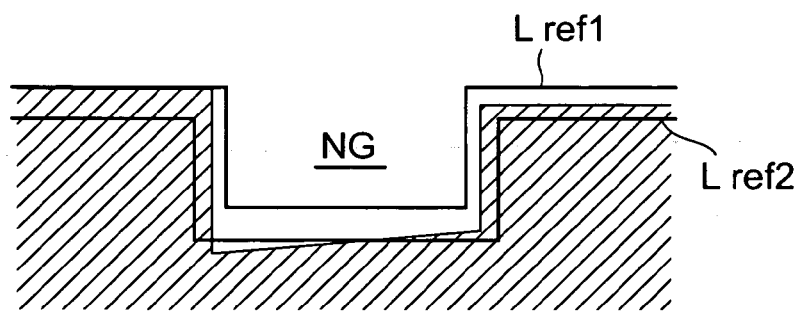
FIG. 4 is a drawing showing a method of determining whether a sample shape is good or bad using the pseudo reference image Sref1 (when result is NG).

FIG. 3 and FIG. 4 are drawings showing overlapped images of a pit section cross sectional shape image and the pseudo reference image Sref1, where an operator moves and rotates the pseudo reference image Sref1 on the screen using the input operation section 62 so that a line profile of the sample shape fits between reference line profiles Lref1 and Lref2 of the pseudo reference image Sref1.

As a result, as shown in FIG. 3, if it is possible to fit the line profile of the sample shape between the reference line profiles Lref1 and Lref2, it is determined that the shape of the pit is in spec. On the other hand, as shown in FIG. 4, if it is not possible to fit the line profile of the sample shape between the reference line profiles Lref1 and Lref2, no matter how the pseudo reference image Sref1 is moved and rotated, it is determined that the shape of the pit is out of spec.

Figure 5:
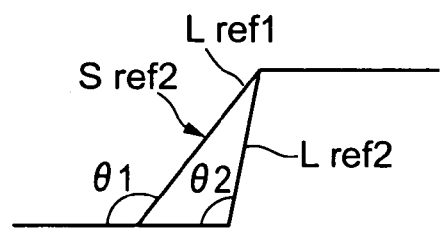
FIG. 5 is a drawing showing one example of a pseudo reference (Sref2).

FIG. 5 is a drawing showing another example of the pseudo reference image Sref (Sref2), and includes a reference line profile Lref1 having a bent section of angle θ1, and a reference line profile Lref2 having a bent section of angle θ2. This pseudo reference image Sref2 constitutes an index when determining whether the shape of a stepped section formed on a sample surface is good or bad.

Figure 6:
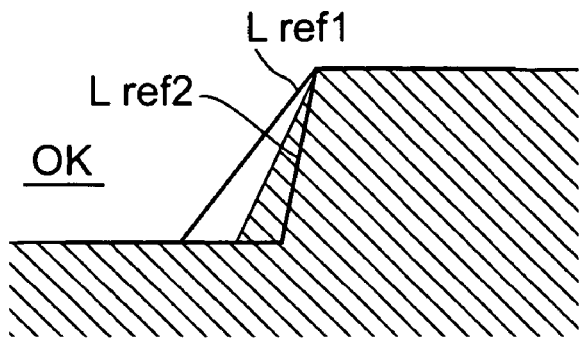
FIG. 6 is a drawing showing a method of determining whether a sample shape is good or bad using the pseudo reference image Sref2 (when result is OK).
Figure 7:
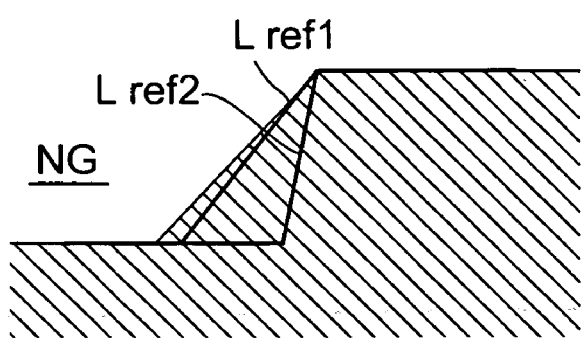
FIG. 7 is a drawing showing a method of determining whether a sample shape is good or bad using the pseudo reference image Sref2 (when result is NG).

FIG. 6 and FIG. 7 are drawings showing overlapped images of the inclined section cross sectional shape and the pseudo reference image Sref2, where an operator moves and rotates the pseudo reference image Sref2 on the screen using the input operation section 62 so that a line profile of the sample shape fits between reference line profiles Lref1 and Lref2 of the pseudo reference image Sref2.

As a result, as shown in FIG. 6, if it is possible to fit the line profile of the sample shape between the reference line profiles Lref1 and Lref2, it is determined that the shape of the inclined section is in spec. On the other hand, as shown in FIG. 7, if it is not possible to fit the line profile of the sample shape between the reference line profiles Lref1 and Lref2, no matter how the pseudo reference image Sref2 is moved and rotated, it is determined that the shape of the inclined section is out of spec.

Figure 8:
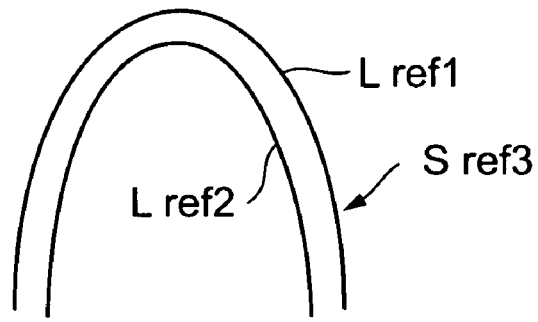
FIG. 8 is a drawing showing one example of a pseudo reference (Sref3).

FIG. 8 is a drawing showing another example of the pseudo reference image Sref (Sref3), composed of a pair of arc shaped reference line profiles Lref1 and Lref2 arranged apart from each other in parallel. This pseudo reference image Sref3 constitutes an index when determining whether the shape of a projection formed on a sample surface is good or bad.

Figure 9:
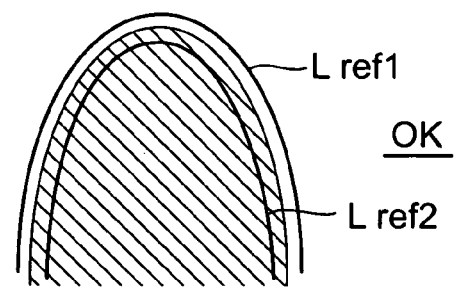
FIG. 9 is a drawing showing a method of determining whether a sample shape is good or bad using the pseudo reference image Sref3 (when result is OK).
Figure 10:
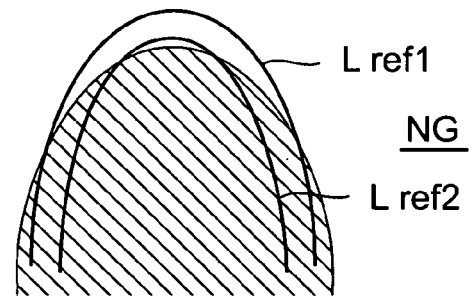
FIG. 10 is a drawing showing a method of determining whether a sample shape is good or bad using the pseudo reference image Sref3 (when result is NG).

FIG. 9 and FIG. 10 are drawings showing overlapped images of a projecting section cross sectional shape and the pseudo reference image Sref3, where an operator moves and rotates the pseudo reference image Sref3 on the screen using the input operation section 62 so that a line profile of the projecting section fits between reference line profiles Lref1 and Lref2 of the pseudo reference image Sref3.

As a result, as shown in FIG. 9, if it is possible to fit the line profile of the projecting section between the reference line profiles Lref1 and Lref2, it is determined that the shape of the projecting section is in spec. On the other hand, as shown in FIG. 10, if it is not possible to fit the line profile of the projecting section between the reference line profiles Lref1 and Lref2, no matter how the pseudo reference image Sref3 is moved and rotated, it is determined that the shape of the projecting section is out of spec.

Figure 11:
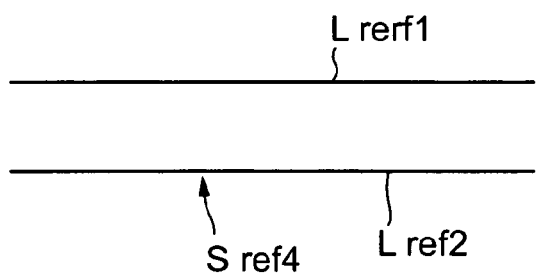
FIG. 11 is a drawing showing one example of a pseudo reference (Sref4).

FIG. 11 is a drawing showing a further example of the pseudo reference image Sref (Sref4), composed of a pair reference line profiles Lref1 and Lref2 arranged apart from each other in parallel. This pseudo reference image Sref4 constitutes an index when determining whether the roughness of a sample surface is good or bad.

Figure 12:
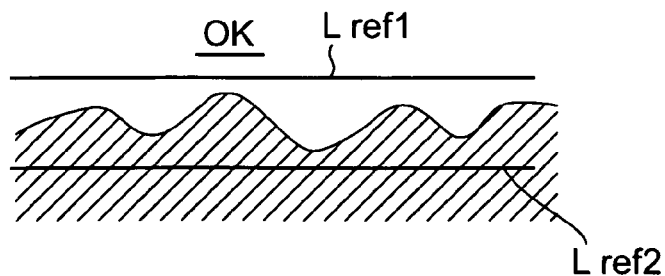
FIG. 12 is a drawing showing a method of determining whether a sample shape is good or bad using the pseudo reference image Sref4 (when result is OK).
Figure 13:
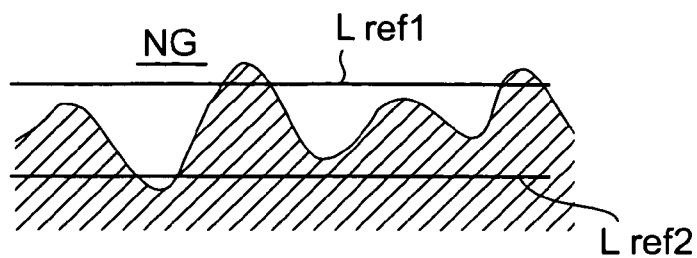
FIG. 13 is a drawing showing a method of determining whether a sample shape is good or bad using the pseudo reference image Sref4 (when result is NG).

FIG. 12 and FIG. 13 are drawings showing overlapped images of the cross sectional shape of the sample surface and the pseudo reference image Sref4, where an operator moves and rotates the pseudo reference image Sref4 on the screen using the input operation section 62 so that a line profile of the sample surface fits between reference line profiles Lref1 and Lref2 of the pseudo reference image Sref4.

As a result, as shown in FIG. 12, if it is possible to fit the line profile of the surface shape between a pair of reference line profiles Lref1 and Lref2, it is determined that the roughness of the sample surface is in spec. On the other hand, as shown in FIG. 13, if it is not possible to fit the line profile of the surface shape between the reference line profiles Lref1 and Lref2, no matter how the pseudo reference image Sref4 is moved and rotated, it is determined that the roughness of the sample surface is out of spec.

In this way, with this embodiment a pseudo reference image Sref, constituting an index when determining whether a sample shape is good or bad, is overlapped on a sample image and displayed, and if it is possible to confirm that the line profile of the sample shape has a specified relationship with respect to the pseudo reference image Sref, it is determined that the sample is in spec, and so it becomes easy to judge the sample.

Figure 14:
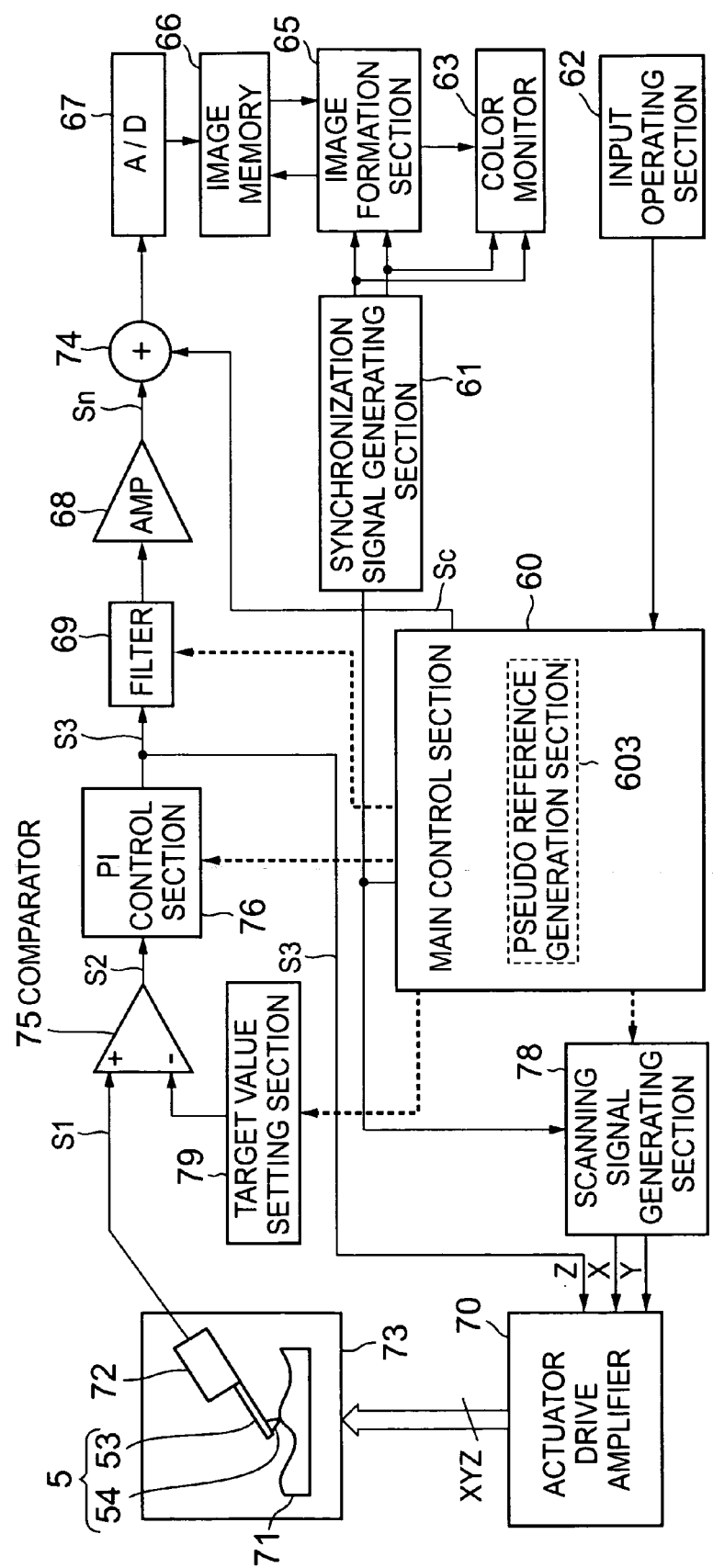
FIG. 14 is a block diagram of a second embodiment of a scanning probe microscope adopting the present invention.
Figure 18:
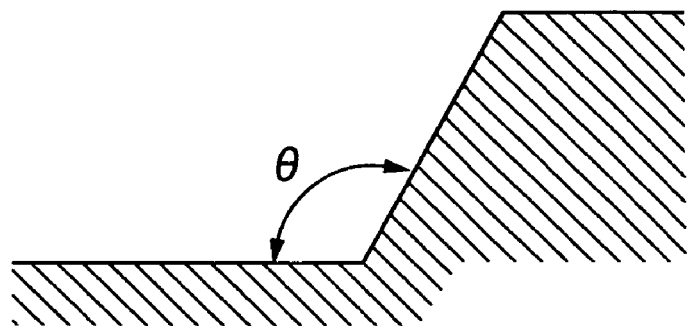
FIG. 18 is a drawing showing the shape of a sample subjected to good/bad determination.
Figure 19:
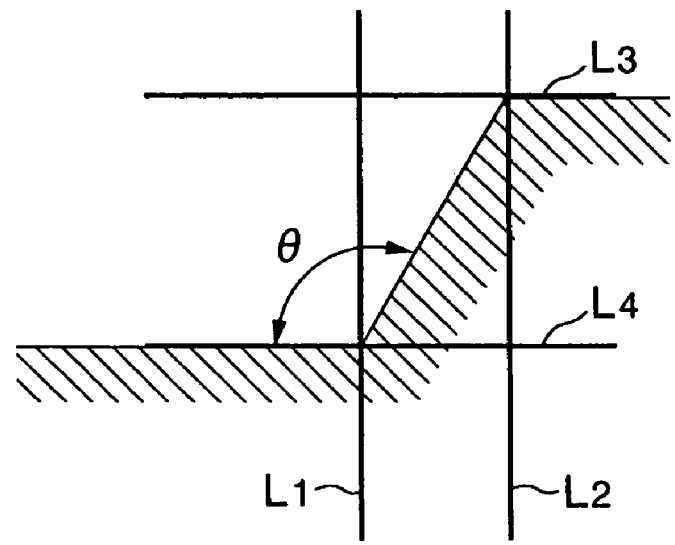
FIG. 19 is a drawing showing a related art method for determining whether a sample is good or bad.

FIG. 14 is a block diagram of a second embodiment of a scanning probe microscope adopting the present invention. The same reference numerals represent the same sections as previously described.

With this embodiment, an adding circuit 74 is added between the amplifier 68 and the A/D converter 67. A pseudo reference image Sref generated by the pseudo reference generating section 603 of the main control section 60 is superimposed on the output signal of the amplifier 68 and input to the A/D converter 67, and this superimposed signal is displayed on the color monitor 63.

Figure 15:
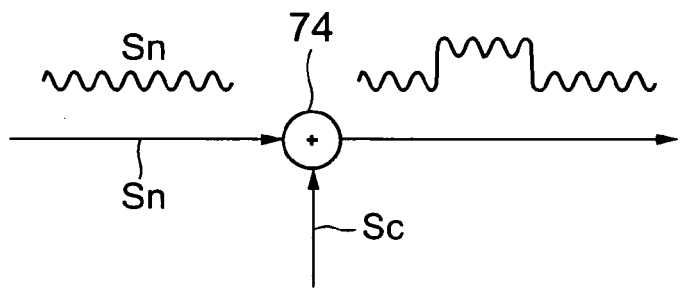
FIG. 15 is a drawing showing operation of an adding circuit.

FIG. 15 is a drawing showing the operation of the adding circuit 74. A signal at the time of not scanning, namely a noise component Sn, is input from the amplifier 68, and a reference rectangular wave Sc is input from the pseudo reference generating section 603 of the main control section 60. A peak value of the reference rectangular wave Sc is set to an upper limit value An of the noise level, and the frequency of the reference rectangular wave Sc is set lower than the frequency of the noise component Sn.

Figure 16:
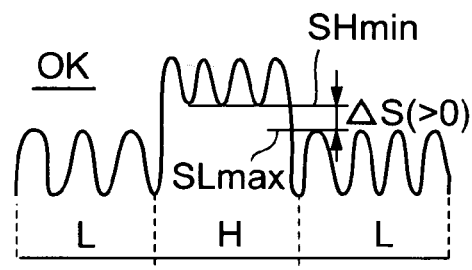
FIG. 16 is a drawing showing a method of determining whether a sample shape is good or bad in the second embodiment (when result is OK).
Figure 17:
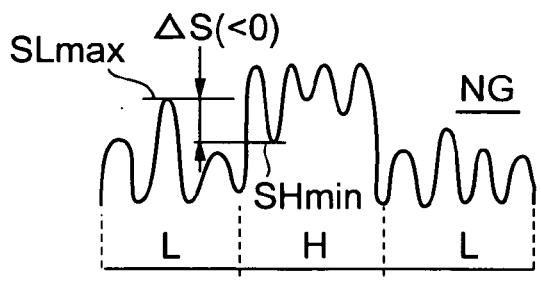
FIG. 17 is a drawing showing a method of determining whether a sample shape, is good or bad in the second embodiment (when result is NG).

In this type of structure, if the level of the noise component Sn is lower than the upper limit value An, as shown in FIG. 16, a difference value ΔS (=SHmin=SLmax) between a minimum value SHmin of the superimposed signal during the period when the reference rectangular wave Sc is H level, and a maximum value SLmax of the superimposed signal during the period when the reference rectangular wave Sc is L level, becomes positive. On the other hand, if the level of the noise component Sn is higher than the upper limit value An, as shown in FIG. 17, a difference value ΔS becomes negative. Accordingly, by simply confirming a signal waveform displayed on a monitor, it becomes possible for an operator to easily recognize whether or not a noise level is within a permitted range. Detection and judging of the difference level ΔS is not limited to visual observation and can also be carried out automatically.

In this way, with this embodiment, a reference signal having a specified peak value and a signal representing the strain amount of a cantilever are superimposed and displayed, which means that by comparing a minimum level of the superimposed signal during the period when the reference signal is H level with a maximum level of the superimposed signal during the period when the reference signal is L level, it is possible to easily determine whether or not deviation of a signal representing the strain amount is greater than the peak value. Accordingly, if the peak value of the reference signal is set to a reference value for good or bad determination, it becomes possible to judge whether or not a sample is good simply by confirming an image.

With the second embodiment described above, a description has been given for the case where a noise component is output from the amplifier circuit 68, but the present invention is not thus limited and if a signal obtained by scanning a sample surface is output together with adjustment of the peak value of the reference rectangular wave Sc to a roughness reference value for the sample surface, it is possible to confirm whether or not roughness of the sample surface is within a reference range.

The present invention achieves the following effects.

(1) A pseudo reference image Sref constituting an index when determining whether a sample shape is good or bad is superimposed on a sample image and displayed, and if it is possible to confirm that a line profile of the sample shape has a specified relationship with respect to the pseudo reference image Sref it is determined that the sample is in spec, which means that it is easy to determine whether a sample is good or bad.

(2) Since a reference signal having a specified peak value and a signal representing the strain amount of a cantilever are superposed and displayed, it is possible to easily determine whether or not deviation of a signal representing the strain amount is greater than a peak value of a reference signal by comparing a minimum level of the superimposed signal during the period when the reference signal is H level with a maximum level of the superimposed signal during the period when the reference signal is L level. Accordingly, if the peak value of the reference signal is set to a reference value for good or bad determination it becomes possible to determine whether a sample is good or bad by simply confirming an image.

The invention claimed is:

1. A scanning probe microscope for causing a probe provided on a free end of a cantilever to approach or contact a sample surface, scanning in X and Y directions while moving slowly in a Z direction so that a distance between the probe and the sample surface is kept constant, and displaying a sample image based on a strain amount of the cantilever, comprising:
   means for generating a reference signal having a specified peak-to-peak value;
   means for superimposing a signal representing an amount of strain of the cantilever and the reference signal, the frequency of the reference signal being lower than the frequency of the signal representing the amount of strain; and
   means for displaying a line profile of the superimposed signal.

2. A scanning probe microscope according to claim 1; further comprising means for adjusting the peak-to-peak value of the reference signal.

3. A scanning probe microscope according to claim 1; further comprising means for comparing a minimum level of a superimposed signal during a period the reference signal is at a high level with a maximum level of the superimposed signal during a period the reference signal is at a low level; and means for outputting the comparison results.

* * * * *